Figure 13:
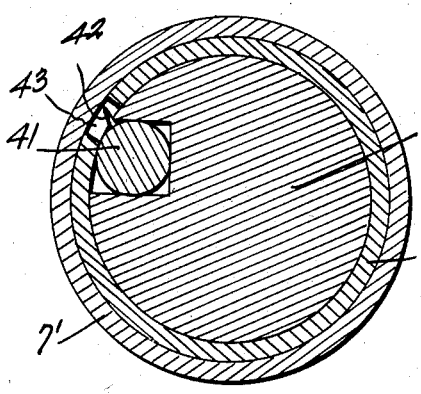

April 3, 1934.  G. W. B. WHITE ET AL  1,953,205
PAPER TUBE CUTTING DEVICE
Filed Sept. 12, 1932  6 Sheets-Sheet 1
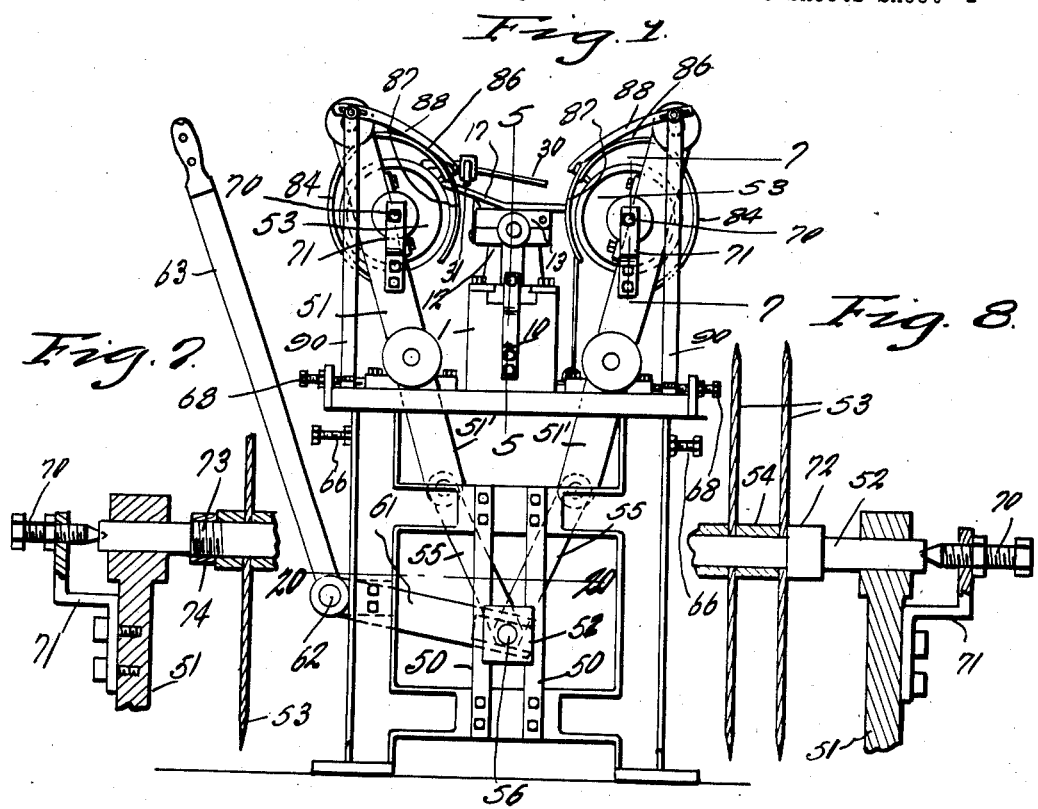
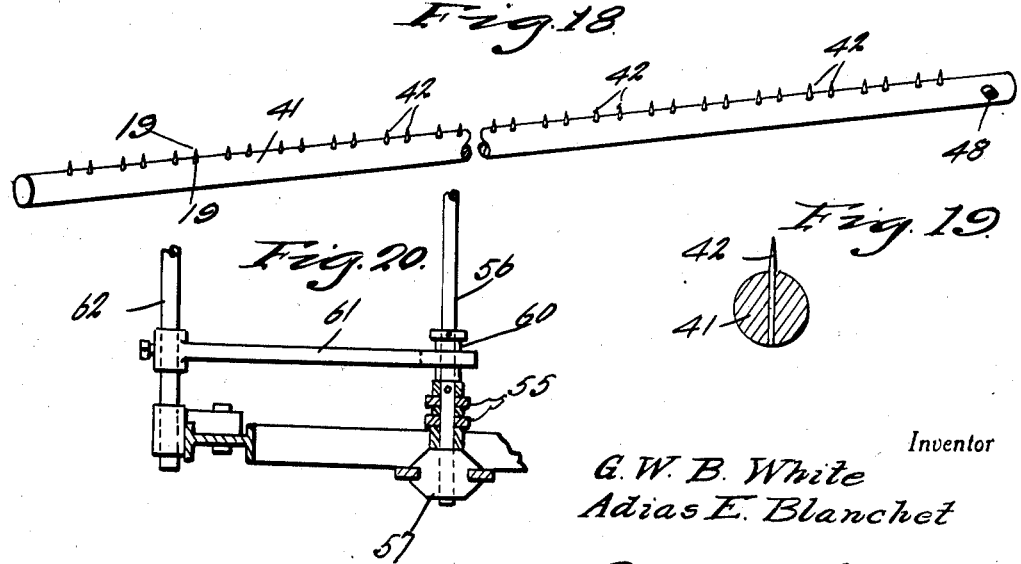
Inventor
G. W. B. White
Adias E. Blanchet
By Clarence A. O'Brien
Attorney April 3, 1934.  G. W. B. WHITE ET AL  1,953,205
PAPER TUBE CUTTING DEVICE
Filed Sept. 12, 1932   6 Sheets-Sheet 2
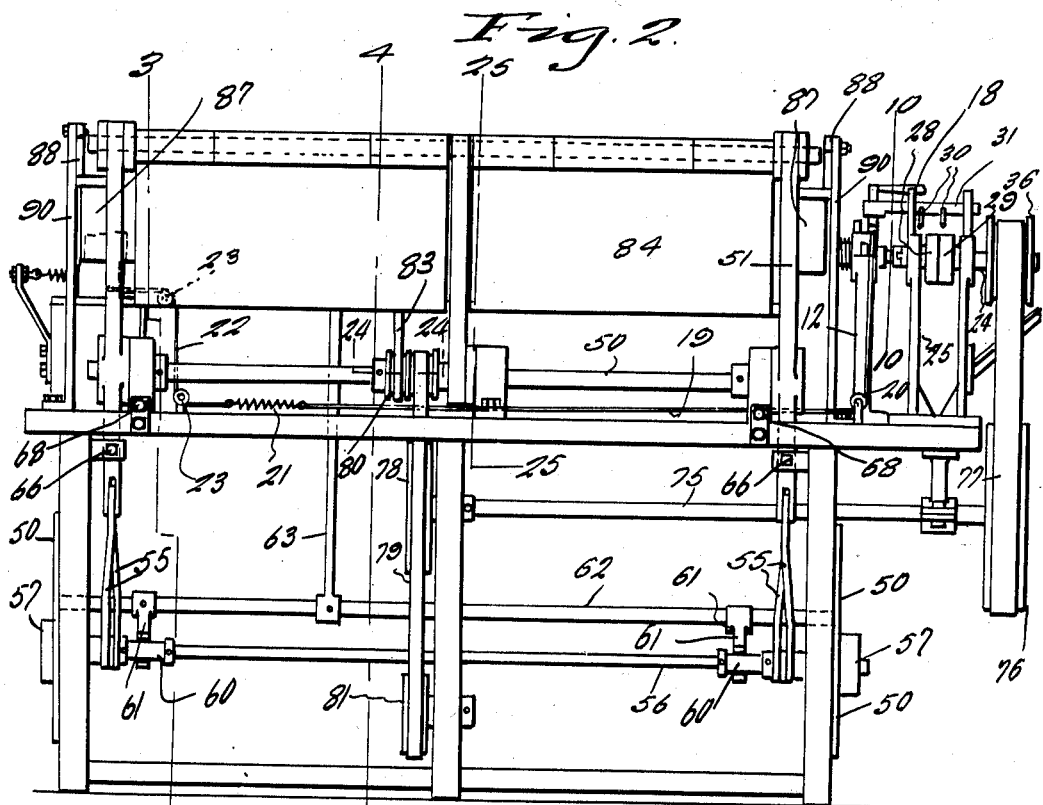
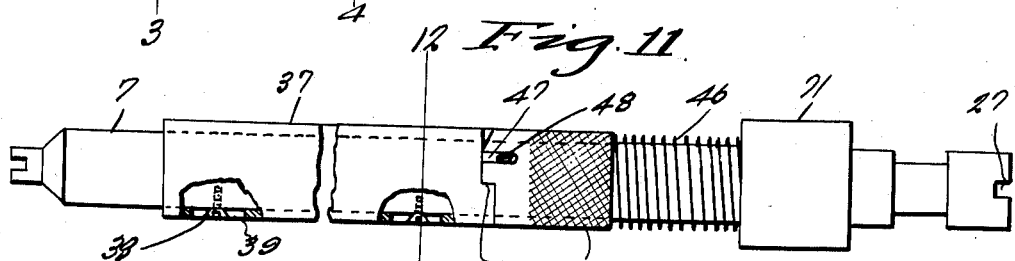
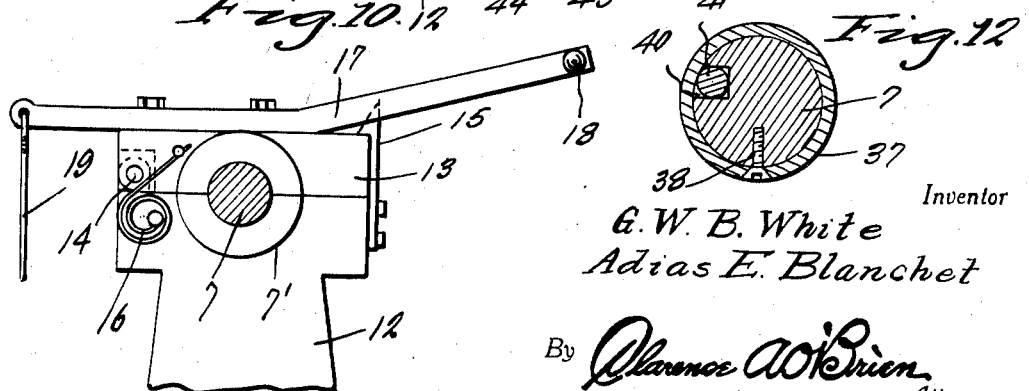
Inventor
G. W. B. White
Adias E. Blanchet
By Clarence A. O'Brien
Attorney April 3, 1934. G. W. B. WHITE ET AL 1,953,205
PAPER TUBE CUTTING DEVICE
Filed Sept. 12, 1932 6 Sheets-Sheet 3
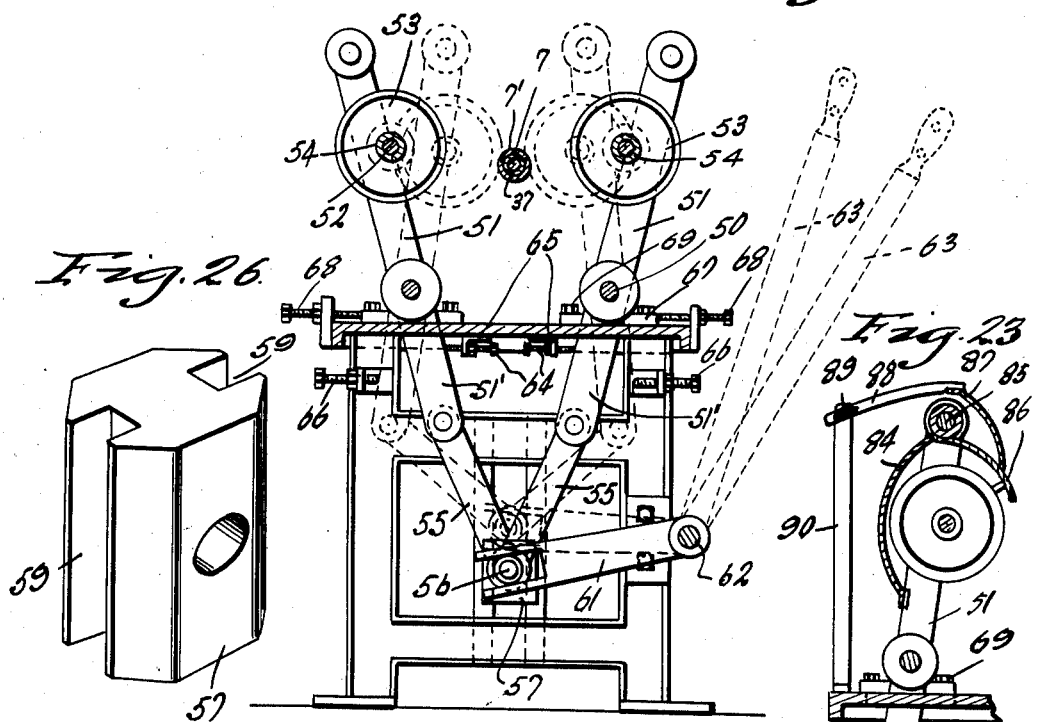
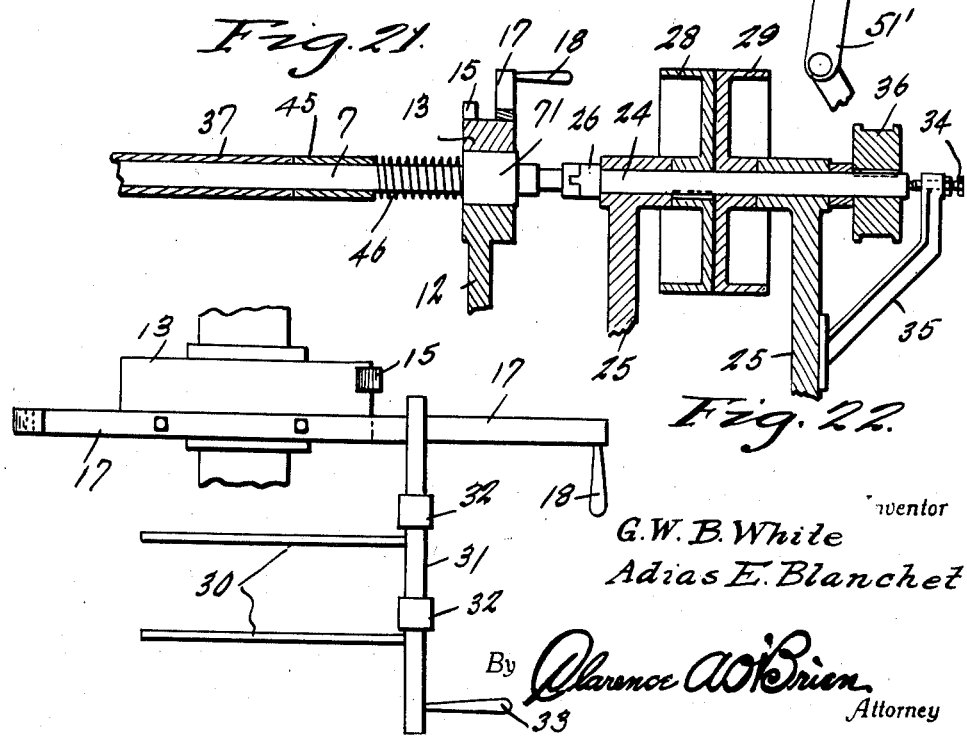
Inventor
G. W. B. White
Adias E. Blanchet
By Clarence A. O'Brien
Attorney April 3, 1934.   G. W. B. WHITE ET AL   1,953,205
PAPER TUBE CUTTING DEVICE
Filed Sept. 12, 1932   6 Sheets-Sheet 4
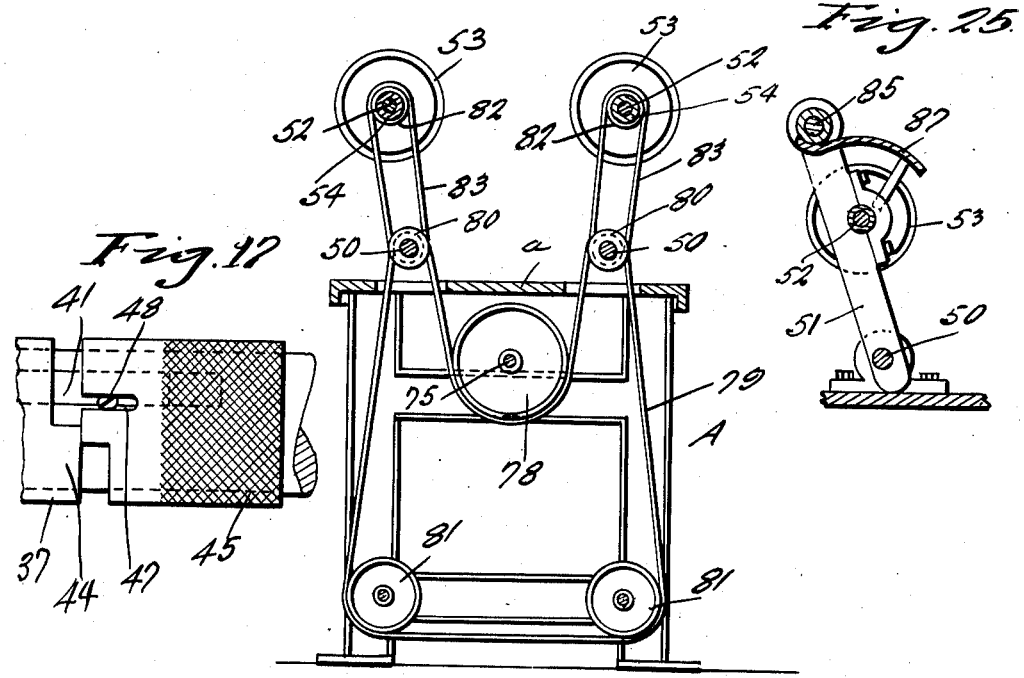
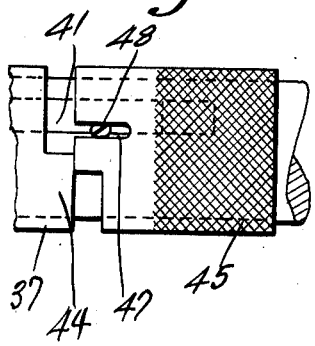
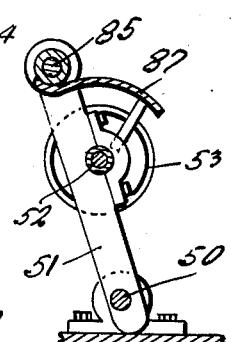
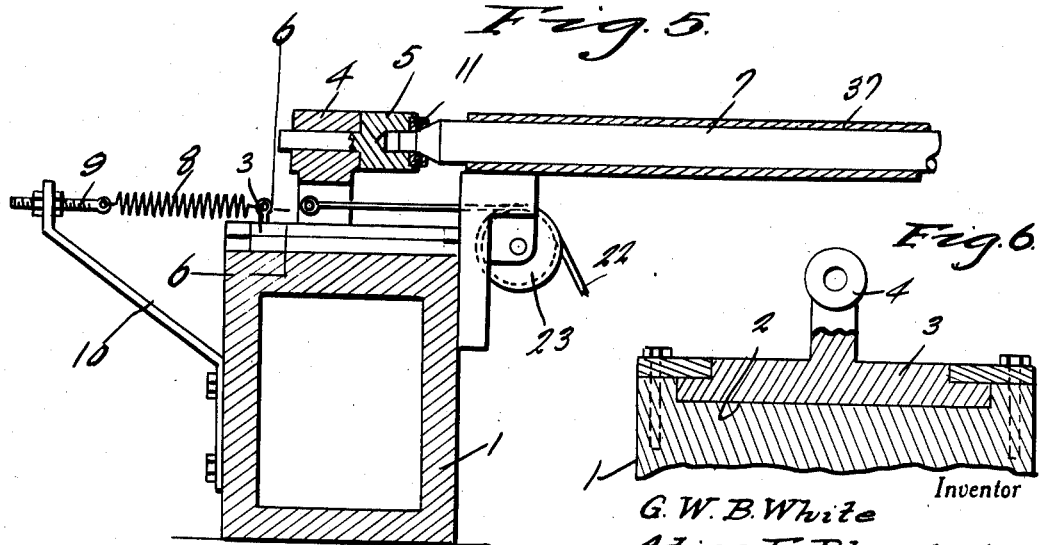
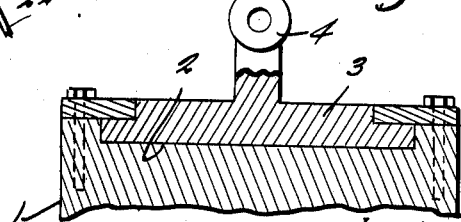
Inventor
G. W. B. White
Adias E. Blanchet
By Clarence A. O'Brien
Attorney April 3, 1934.  G. W. B. WHITE ET AL  1,953,205
PAPER TUBE CUTTING DEVICE
Filed Sept. 12, 1932  6 Sheets-Sheet 5

Inventor
G. W. B. White
Adias E. Blanchet
By Clarence A. O'Brien
Attorney

Patented Apr. 3, 1934

1,953,205

UNITED STATES PATENT OFFICE 1,953,205

PAPER TUBE CUTTING DEVICE

George W. Blunt White and Adias E. Blanchet, Mystic, Conn.

Application September 12, 1932, Serial No. 632,834

10 Claims. (Cl. 164—69)

This invention relates to a device for cutting tubes of paper and the like into short lengths for use in winding tape and the like thereon, the general object of the invention being to provide sets of cutting disks for cutting the tube which is placed on a specially designed mandrel, with the knives or disks so placed that one set will counteract the pressure of the other set against the tubes on the mandrel.

Another object of the invention is to provide supporting means for the mandrel which are so constructed and arranged that the mandrel with the tube thereon can be readily removed and placed in a slitting or re-winding machine, after the tube has been cut to the length or lengths desired.

Another object of the invention is to provide means for locking the sections of the cut tube to the mandrel and also for holding the tube on the mandrel before it is cut, such locking means also holding the sections of the tube in place on the mandrel after the mandrel has been transferred to the winding machine.

Another object of the invention is to provide a sleeve on the mandrel and means for adjusting the same when the sleeve is damaged by the knives.

A still further object of the invention is to provide a guard for each set of knives with means for placing the guard in operative position when the knives are moved away from the mandrel and for withdrawing a section of the guard when the knives are moved towards the mandrel.

A still further object of the invention is to provide simple means for moving the sets of knives simultaneously towards and away from the mandrel.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an end view of the apparatus.
Fig. 2 is an elevation thereof.
Fig. 3 is a section on line 3—3 of Fig. 2.
Fig. 4 is a section on line 4—4 of Fig. 2.
Fig. 5 is a section on line 5—5 of Fig. 1.
Fig. 6 is a section on line 6—6 of Fig. 5.
Fig. 7 is a section on line 7—7 of Fig. 1.

Figure 14:
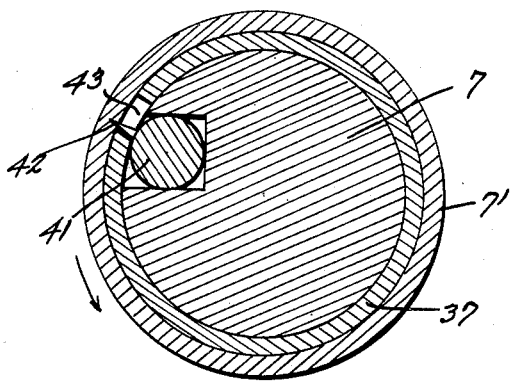
Figure 15:
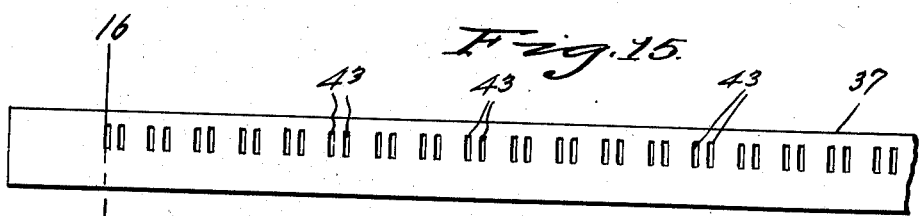
Figure 9:
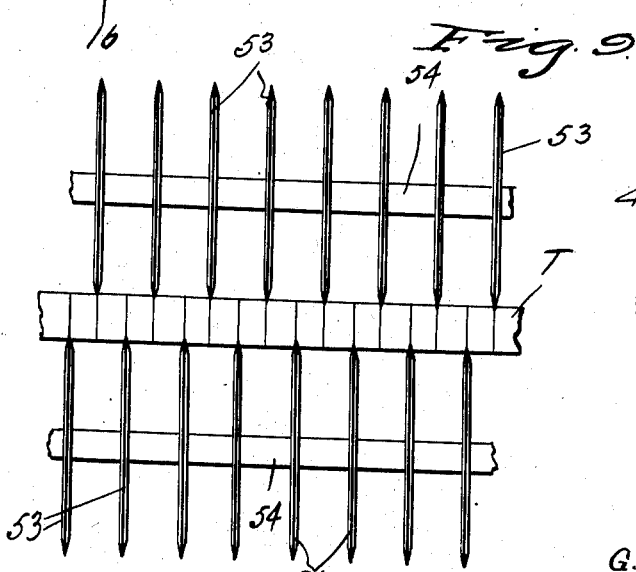
Figure 16:
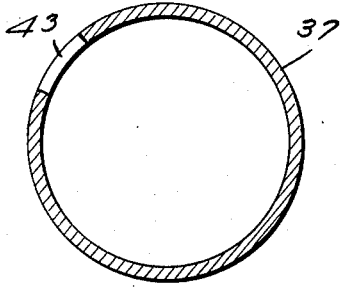
Figure 24:
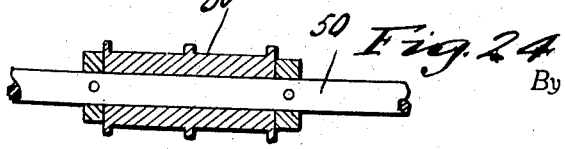
Figure 27:
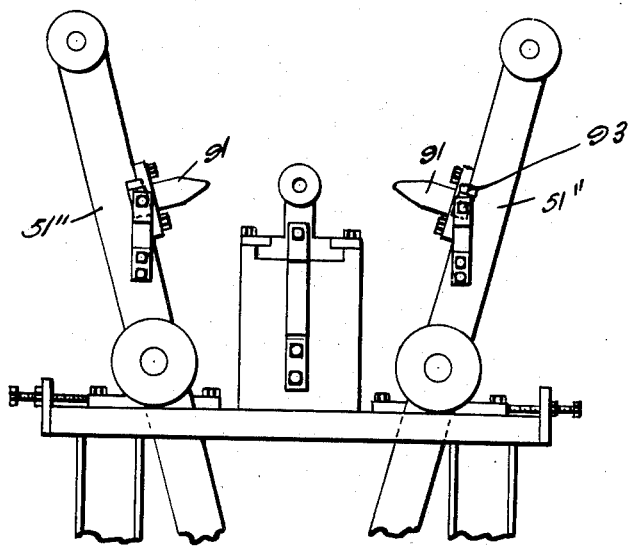
Figure 28:
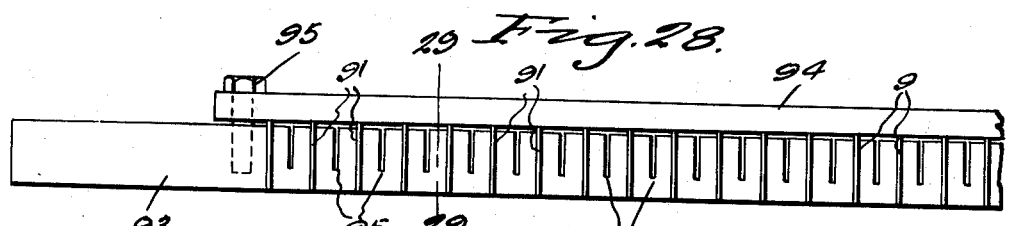
Figure 29:
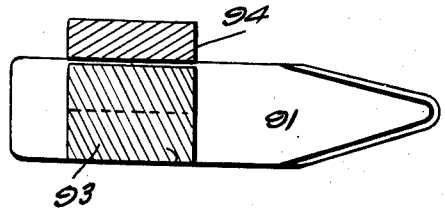
Figure 31:
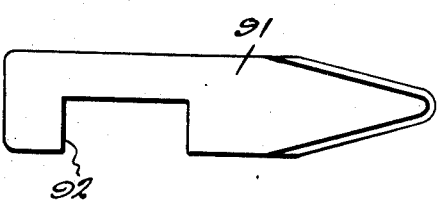
Figure 30:
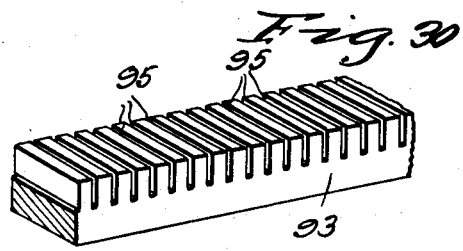

Fig. 8 is a view similar to Fig. 7 but showing the opposite end of the disk carrying shaft and its adjustment means.
Fig. 9 is a top plan view showing the cutting disks engaging a tube on the mandrel.
Fig. 10 is a section on line 10—10 of Fig. 2.
Fig. 11 is a view of the mandrel and the parts associated therewith, with parts broken away.
Fig. 12 is a section on line 12—12 of Fig. 11.
Fig. 13 is an enlarged transverse sectional view through Fig. 11 with the paper tube on the mandrel and with the pin carrying rod in unlocking position.
Fig. 14 is a similar view, but showing the locking means in locking position.
Fig. 15 is a view of the sleeve which surrounds the mandrel.
Fig. 16 is a section on line 16—16 of Fig. 15.
Fig. 17 is a fragmentary elevation showing the adjusting means for the pin carrying rod.
Fig. 18 is a view of the pin carrying rod.
Fig. 19 is a section on line 19—19 of Fig. 18.
Fig. 20 is a section on line 20—20 of Fig. 1.
Fig. 21 is a sectional view of the driving means for the mandrel.
Fig. 22 is a top plan view showing the belt shifting means, and a portion of a bearing for the mandrel.
Fig. 23 is a transverse sectional view showing the guard means for one set of the cutting disks with such means in the position they assume when the disks are in cutting position.
Fig. 24 is a section on line 24—24 of Fig. 2.
Fig. 25 is a section on line 25—25 of Fig. 2.
Fig. 26 is a perspective view of one of the sliding blocks for moving the cutting disks into operative and inoperative position.
Fig. 27 is an end view showing a modification.
Fig. 28 is a view of the knife carrying member shown in Fig. 27.
Fig. 29 is a section on line 29—29 of Fig. 28.
Fig. 30 is a fragmentary perspective view of the knife carrier.
Fig. 31 is a side view of one of the knives used in the modified form of the invention.

In these drawings, the letter A indicates an upright frame which is provided with a top $a$ which at one end supports the member 1, the top of which is provided with a longitudinally extending guideway 2 for the slide 3 which carries the bearing member 4 for a chuck 5 for one end of the mandrel 7. A spring 8 has one end attached to the slide 3 and its other end attached to a screw or bolt 9 which is adjustably supported in a bracket 10 attached to the member 1. This spring tends to move the slide 3 outwardly so as to move the chuck 5 away from the end of the mandrel. The chuck is provided with the anti-friction means 11 for the reduced end of the mandrel as shown in Fig. 5.

An upright 12 is placed at the opposite end of the top a and has a semi-circular bearing at its upper end for the enlarged bearing part 7' of the mandrel. A cap 13 is hinged to the upper end of the upright 12 as shown at 14, in Fig. 10, and has a semi-circular recess therein which registers with the semi-circular recess in the upright 12 when the cap is in closed position, and a latch 15 holds the cap in closed position. A spring 16 tends to swing the cap to open position. A bar 17 is attached to the cap and has a handle 18 at one end thereof and the other or inner end has a cable 19 attached thereto which passes under a guiding pulley 20 on the top a and extends toward the opposite end of the top where it is connected to a spring 21 to the other end of which a cable 22 is attached which passes over the guiding pulleys 23 and has its opposite end connected to the slide 3.

Thus when the cap is in closed position, tension will be exerted on the spring 21 which will be greater than the tension on the spring 8 so that the slide 3 will be in a position to cause the chuck 5 to support the adjacent end of the mandrel, but when the cap 13 is swung to open position, the tension on the spring 21 will be reduced so that the spring 8 will move the slide 3 outwardly, so that the chuck 5 will free itself from the mandrel and thus the mandrel can be lifted out of the device.

A shaft 24 is journalled in the upright 25 at that end of the table or frame which carries the upright 12 and the inner end of this shaft has a tongue carrying enlargement 26 thereon, the tongue of which engages a kerf 27 in the adjacent end of the mandrel so that the rotary movement of this shaft 24 is imparted to the mandrel. This shaft 24 carries a fast pulley 28 and a loose pulley 29 for receiving a belt driven from any suitable source of power and said belt is shifted by the fingers 30 on a bar 31 slidably supported in the members 32 and provided with a handle 33 by which it can be shifted to cause the fingers to move the belt from the loose pulley onto the fast pulley and vice versa. When the belt is on the fast pulley the rod 31 extends over the bar 17, as shown in Fig. 22, so that the cap 13 of the bearing upright 12 cannot be lifted until the belt has been moved over upon the loose pulley.

The shaft 24 can be adjusted longitudinally through means of a set screw 34 carried by a bracket 35 and engaging the outer end of the shaft 24, as shown in Fig. 21. The outer end of the shaft carries a pulley 36.

A sleeve 37 fits over a part of the mandrel and is fastened thereto by the set screws 38 which pass through slots 39 in the sleeve so that the sleeve can be adjusted longitudinally by loosening the screws. A groove extends longitudinally in a part of the mandrel as shown at 40 for receiving a rod 41 which carries a plurality of pins 42. The sleeve 37 is formed with a plurality of slots 43, one for each pin. One end of the sleeve 37 is of cam shape to form one or more shoulders 44 and a knurled collar or sleeve 45 is slidably arranged on the mandrel and has a similarly shaped end engaging said end of the sleeve. A spring 46 encircles a part of the mandrel and has one end bearing against the part 7', and the other end against the collar 45 and acts to hold the collar against the sleeve 37. A notch 47 is formed in the collar 45 for receiving a pin or projection 48 on the adjacent end of the rod 41 and when the shoulders or cam parts are in engagement with each other as shown in Fig. 11, the rod 41 with the pins is in the position shown in Fig. 14, but when the collar 45 has been moved to the position it occupies in Fig. 17, the rod 41 will be moved to a position where the pins will be located as shown in Fig. 13. These pins act to lock the paper or other tube T to the mandrel sleeve 37 as shown in Fig. 14, and the pins are so arranged, that they will hold the sections of the tube in place after the tube has been cut into sections. It is not necessary to turn the rod 41 to the limit where the pins will engage the ends of the slots 43 in the sleeve for as the knives come into engagement with the tube T, the tube will rotate slightly on the sleeve, as shown by the arrow in Fig. 14, so that the pins will complete their entrance into the tube until they engage the ends of the slots 43 and further movement of the tube on the sleeve will be prevented. This is shown in Fig. 14.

A pair of shafts 50 are rotatably supported on the top a one adjacent each side thereof, and these shafts carry the arms 51, the upper parts of which are provided with bearings for the shafts 52 which carry the cutter disks 53. It will of course be understood that the arms carried by one shaft support one set of cutting disks and the arms supported by the other shaft 50 carries the other set of cutting disks. The disks are held in spaced relation on the shafts by the spacers 54 and the disks of one shaft are alternately arranged with the disks on the other shaft as shown in Fig. 9, and as will be seen from this figure, two sets of disks engage the tube T on the mandrel at substantially opposite sides so that the pressure of one set of disks is counteracted by the other set.

The outermost arms 51 are formed with the depending portions 51' and links 55 have their upper ends connected with the lower ends of these portions and the lower ends of the links are pivotally connected to a shaft 56, the ends of which enter blocks 57 which are guided for vertical movement between the pairs of bars 58 at the ends of the frame, the blocks being provided with the guideways 59 for receiving portions of the guide bars 58.

Collars 60 are attached to the shaft 56 and are engaged by the forked ends of the arms 61 fastened to a shaft 62 journalled in the frame and to which a lever 63 is attached so that by rocking this shaft 62 by the lever, the shaft 56 is moved upwardly which will cause the links 65 to move the extensions 51' of the arms 61 away from each other and thus the upper portions of the arms will move towards each other, thus placing the two sets of disks 53 against the tube T on the mandrel, so that the disks will cut the tube into sections as shown in Fig. 9. Of course by moving the lever 63 in an opposite direction the shaft 56 will be moved downwardly so that the disks will be moved away from the tube.

The outward movement of the disks will be limited by the adjusting screws 64 carried by the brackets 65 attached to the under face of the top a, said screws engaging the inner edges of the extensions 51' and set screws 66 are carried by the frame for engaging the outer edges of the extensions 51' of the arms 51 for limiting the inward movement of the disks. The bearings for each shaft 50 are carried by the blocks 67, slidably supported on the top a and adjusted by the set screws 68 so that by adjusting these blocks 67, the arms 51 can be adjusted inwardly or outwardly as desired and after they are adjusted, they are held in adjusted position by the bolts or screws 69 which pass through the slots in the top a.

The disk carrying shaft can be adjusted longitudinally in the arms 51 through means of the set screws 70 and having pointed ends engaging the ends of these shafts and supported by the brackets 71 carried by the outer arms, as more clearly shown in Figs. 7 and 8. Each shaft has a collar 72 at one end thereof against which the outermost disk abuts and adjacent the other end, the shaft is formed with a threaded part 73 for receiving a nut 74 which holds the assembly of disks and spacers on the shaft. It will of course be understood by using different sizes of spacers any number of disks can be used and the distances the disks are spaced apart can be adjusted.

A shaft 75 is journalled in the frame and carries a pulley 76 over which a belt 77 passes which also passes over the pulley 36 on the shaft 24 so that the shaft 75 is driven from said shaft 24. This shaft 75 carries a pulley 78 at its inner end which is arranged at substantially the central part of the frame and a belt 79 passes under the pulley 78 thence over one part of a double pulley 80 rotatably supported on each shaft 50, as more clearly shown in Fig. 24, and then the belt after passing over these pulleys 80, passes under the pair of pulleys 81 at the lower part of the frame. Each disk carrying shaft 62 carries a pulley 82 over which a belt 83 passes and each belt 83 passes over the second part of a double pulley 80. Thus the disk carrying shafts are rotated by the belts 83 which derive their motion from the double pulleys 80, which in turn are rotated from the endless belt 79 driven from the shaft 75. This arrangement of belts and pulleys will rotate the disk carrying shafts without interfering with the swinging movement of the supporting arms of the disk carrying shafts.

A guard or shield 84 extends over portions of each set of disks and has its lower edge connected with the arms 51 and its upper edge is rolled about a rod 85 carried by the upper ends of the arms and another shield 86 has one edge rolled about the rod and this shield extends downwardly over the upper portion of the disk as shown in Fig. 23. A movable shield 87 is carried by the bars 88 which have pin and slot connections shown at 89 with the uprights 90 supported from the top a. A shield section 87 slides on the shield section 86 and when the cutting disks are moved inwardly to engage the tube the sections 87 slide over the sections 86 as shown in Fig. 23 so that said sections 87 will be out of the way of the disks engaging the tube. When the cutting disks are moved outwardly into inoperative position however, the sections 87 will move downwardly and cover the disks as shown in Fig. 1 so as to prevent the operator from being injured by the disks when the same are moved to inoperative position when he is removing or replacing a mandrel or otherwise working between the two sets of disks.

In the modification shown in Figs. 27 to 31, stationary knives 91 are used instead of the disks. Each knife is preferably of the shape shown in Fig. 1, and has a recess 92 therein and these knives are carried by the blocks 93 of elongated form and provided with the slots 94 for receiving the recessed portions of the knives as shown in Fig. 29. After the knives are placed in the slots a bar 94 is fastened over the slotted portion of each block 93 by the bolts 95 for holding the knives in position. These elongated blocks 93 are fastened to the arms 51" as shown in Fig. 27. Otherwise, the device is the same as that shown in the other figures.

From the foregoing it will be seen that I have provided means for cutting tubes of paper or the like into sections so that the sections can receive tape or the like and the invention can be used with tubes of either the parallel or spiral wound types and the sections will have smooth edges and there will be no danger of chipping, flaking, or the accumulation of dust as occurs when the tubes are cut by saws which necessitates the treatment of the tubes with paraffine or the like.

By providing the adjustable sleeve on the mandrel, when the sleeve is injured or scored by the knives, it can be adjusted to bring other portions opposite the knives and if very badly damaged the sleeve can be removed and a new one substituted therefor. After the tube has been cut into sections, the tube so cut and still on the mandrel can be placed in the winding or other machinery for receiving the material to be placed thereon. While the machine is so constructed that paraffined or otherwise impregnated paper tubes are no longer necessary, it will of course be understood that the machine can be used for cutting tubes so treated if desired.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described our invention what we claim as new is:—

1. A device for cutting tubes of paper and the like, comprising a mandrel for supporting the tube, two sets of knives for cutting the tube into sections, one set of knives being arranged opposite the other set, the knives of one set alternating with those of the other set, each knife having a beveled smooth cutting edge, means for rotating the mandrel, means for rotating the two sets of knives in the same direction, and means for moving the sets of knives towards and away from the mandrel.

2. In a tube cutting machine, a mandrel, having a longitudinally extending groove therein, a sleeve encircling the mandrel and having transverse slots therein, means for adjusting the sleeve longitudinally on the mandrel, a bar located in the groove and having pins thereon extending into the slots in the sleeve for locking a tube, or the sections thereof, after the tube has been cut, to the mandrel, and means for turning the bar in the groove to project and retract the pins in the slots in the sleeve.

3. A device for cutting tubes of paper or the like, comprising a supporting frame, bearing members carried by the frame, a mandrel removably supported in said bearing members, means for locking a tube, or the sections thereof, when the tube is cut into sections, on the mandrel, two sets of arms supported in the frame, a set of knives carried by each set of arms, the knives of one set being oppositely arranged to the knives of the other set and alternating with the knives of the other set, means for moving the arms towards and away from each other to engage and disengage the knives with the tubes on the mandrel and means for rotating the mandrel, means for adjusting the arms toward and away from each other.

4. A tube cutting machine comprising a supporting frame, bearing members carried by the frame, a slide carried by one member, a hinged cap carried by the other member, a bearing part carried by the slide, a mandrel having one end slidably and rotatably arranged in said bearing part, the other end of the mandrel being held in the other bearing member by the cap, spring means for moving the slide to a position where the bearing part will free itself of the mandrel, a lock for normally holding the cap in closed position, a spring for holding the cap in open position, a flexible member connected with the cap, means including a spring for connecting the flexible member with the slide whereby when the cap is in open position the spring of the slide will move the same to a position to free the bearing part thereof from the mandrel to permit removal of the mandrel, a pair of sets of arms pivotally supported by the frame, knives carried by each set of arms, means for moving the sets of arms towards and away from each other, the knives engaging a tube on the mandrel when the arms are moved towards each other and means for rotating the mandrel.

5. A tube cutting device comprising a frame, a tube supporting mandrel rotatably supported thereby, two sets of knife supporting arms pivotally supported in the frame, means for moving the arms of one set towards and away from the arms of the other set, the knives of the arms engaging the tube or mandrel when the arms are moved towards each other, means for rotating the mandrel, and guards for the knives, each guard including a movable section which automatically covers portions of the knives when the knives are in inoperative position and to move away from said portions of the knives when the knives are in cutting position.

6. A tube cutting device comprising a supporting frame, a tube supporting mandrel removably rotatably supported thereby, two sets of arms pivotally supported in the frame, one on each side of the mandrel, knives carried by each set of arms, means for simultaneously moving the sets of arms towards each other or away from each other, means for adjusting the positions of the arms towards and away from each other, and adjustable stop means for limiting the outward and inward movement of the sets of arms.

7. A tube cutting device comprising a supporting frame, a tube supporting mandrel rotatably and removably supported thereby, two sets of arms pivotally arranged in the frame, one on one side of the mandrel and one on the opposite side thereof, a set of rotary cutting disks carried by each set of arms, means for simultaneously moving both sets of arms to place the knives in engagement with the tube on the mandrel or to disengage the knives from said tube, means for rotating the mandrel, means actuated from the mandrel rotating means for rotating the sets of cutting disks in the same direction without interfering with the swinging movement of the arms.

8. A tube cutting machine comprising a supporting frame, a pair of bearing members supported thereby, a slide supported by one bearing member, a cap supported by the other bearing member, a mandrel having one end held in one bearing member by its cap, a bearing part on the slide for receiving the other end of the mandrel, a spring for normally holding the slide in a position with the bearing part out of engagement with the mandrel, a lock for holding the cap in closed position, a spring for moving the cap into open position, a handle bar fastened to the cap, a flexible member connected with one end of the handle bar, a spring to which the other end of the flexible member is connected, a second flexible member connecting the spring with the slide, a pulley carrying shaft detachably connected with the mandrel, fast and loose pulleys on said shaft, a belt shifter for moving a belt from one pulley to the other, said belt shifter having a part extending over the handle bar when the belt is on the fast pulley to prevent opening movement of the cap.

9. A tube cutting machine comprising a supporting frame, a pair of bearing members supported thereby, a slide supported by one bearing member, a cap supported by the other bearing member, a mandrel having one end held in one bearing member by its cap, a bearing part on the slide for receiving the other end of the mandrel, a spring for normally holding the slide in a position with the bearing part out of engagement with the mandrel, a lock for holding the cap in closed position, a spring for moving the cap into open position, a handle bar fastened to the cap, a flexible member connected with one end of the handle bar, a spring to which the other end of the flexible member is connected, a second flexible member connecting the spring with the slide, a pulley carrying shaft detachably connected with the mandrel, fast and loose pulleys on said shaft, a belt shifter for moving a belt from one pulley to the other, said belt shifter having a part extending over the handle bar when the belt is on the fast pulley to prevent opening movement of the cap, a sleeve or ring member detachably and adjustably mounted on the mandrel, said sleeve or ring member having transverse slots therein, and said mandrel having a groove therein in communication with the slots, a bar located in the groove and having pins thereon extending into the slots, means for adjusting the bar to project and retract the pins in the slots in the sleeve, knife carrying arms arranged in two sets, one on each side of the mandrel, and pivotally connected with the frame, and means for simultaneously moving the bars towards and away from the mandrel.

10. In a tube cutting machine, a mandrel, having a longitudinally extending groove therein, a sleeve encircling the mandrel and having transverse slots therein, a bar located in the groove and having pins thereon extending into the slots in the sleeve for locking the tube, or the sections thereof, after the tube has been cut, to the mandrel, and means for turning the bar in the groove to project and retract the pins in the slots in the sleeve.

GEORGE W. BLUNT WHITE.
ADIAS E. BLANCHET.